James Blake  Auxiliary Table Attachment.

No. 3697

Reissued

Nov 2 1869

Witnesses:
E. W. Griffin
Wm Howard,

Inventor:
James Blake
By
James A Skelton
his atty.

UNITED STATES PATENT OFFICE.

JAMES BLAKE, OF SCRANTON, PENNSYLVANIA, ASSIGNOR TO JAMES BLAKE GEORGE BLAKE.

IMPROVED AUXILIARY TABLE.

Specification forming part of Letters Patent No. 88,121, dated March 22, 1869; Reissue No. 3,697, dated November 2, 1869.

*To all whom it may concern:*

Be it known that I, JAMES BLAKE, of Scranton, in the county of Luzerne and State of Pennsylvania, have invented certain new and useful Improvements in Auxiliary Table Attachments for Sewing-Machines and for other Purposes; and I hereby declare the following to be a full, clear, and exact description of the same, reference being had to the accompanying drawings, in which—

Figure 1:
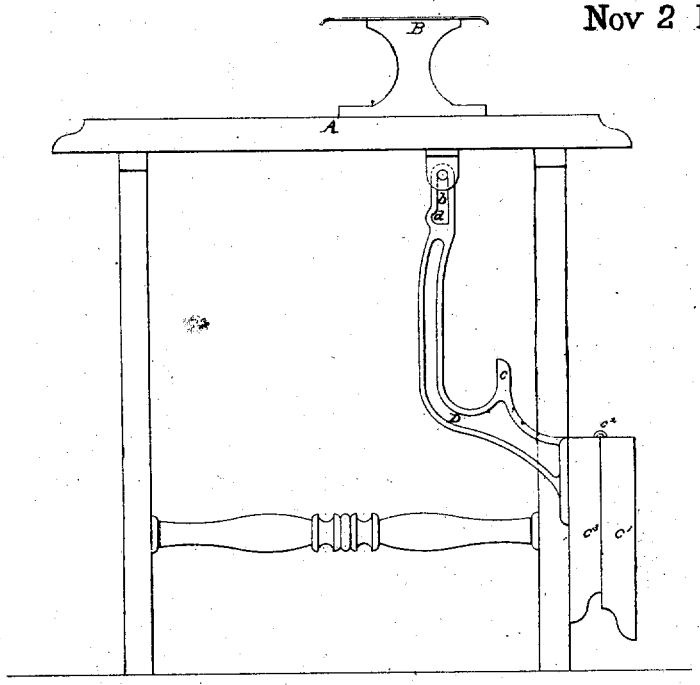
Figure 2:
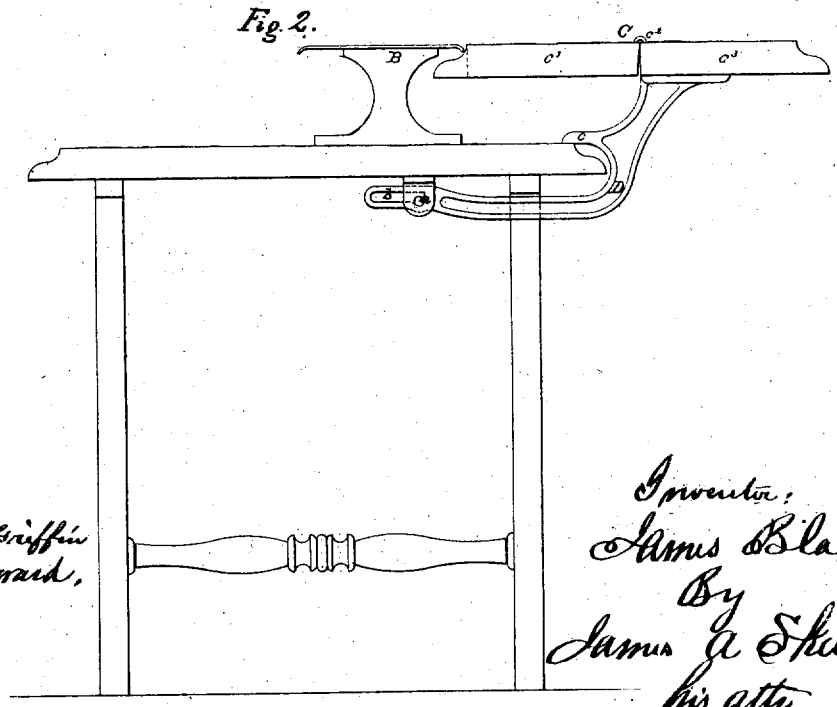

Figure 1 represents a perspective view of a sewing-machine stand with the auxiliary table alongside of the stand. Fig. 2 is an elevation of the same with the auxiliary table raised so as to continue the cloth-plate of a sewing-machine having this cloth-plate raised above the level of the table.

In these figures the same letters refer to the same parts in each, and letter A represents the table-top; B, a raised cloth-plate and stand; C, one form of the auxiliary table; D, the supporting or attaching bracket, arm, hinge, or hanger; *a*, the pin on which D hangs and is secured; *b*, a slot permitting motion of the arm or hinge D on the pin *a*; *c*, the beak, jaw, or rest of the arm or hinge D; *c'*, a folding leaf of one form of the auxiliary table C; $c^2$, the hinge of the folding leaf *c'*; $c^3$, the main part of the auxiliary table to which the hinge hook or bracket D is firmly secured.

It has hitherto been customary to attach leaves to sewing-machine and other tables, shelves, &c., by common hinges, and support them by swivel arms or rests hung in the body or frame of the table, or by a simple bar of wood inserted therein. Being thus hung, when dropped into the pendent position they are still in the way and cumbersome in appearance as well as in fact.

My invention proposes to remedy the defects of this old style by attaching the auxiliary table or leaf in a new and different manner, which will permit it to be put out of the way when out of use and give it also a light and ornamental appearance. It provides an auxiliary adjustable table, platform, or support in any required or desired plane—that is, in continuation of the cloth-plate of a sewing-machine when that cloth-plate is elevated above the table, or in continuation of the table and cloth-plate of a sewing-machine in which their planes practically coincide, or in any other plane, or, finally, in continuation of the plane table or other like convenience to which it may be attached in a similar variety of planes, and in each of these cases is capable of being lowered, swung under the table-top, and hung there out of the way, but ready to be raised into place again for use, all at will.

The construction and operation of my invention are illustrated in one form by Figs. 1 and 2, and may be more fully described as follows, viz:

A represents a sewing-machine stand; B, a raised cloth-plate and stand; C, a double-~~leaf~~ auxiliary table; D, arms or brackets united with the stand at a point or points back from the edge of the main table and beneath it by a horizontal hinge-joint, the effect of which is that the auxiliary table may be swung up, as shown in Fig. 2, or lowered, as in Fig. 1, and also still further lowered by permitting the folding leaf *c'* to fall down upon the leaf $c^3$.

The auxiliary table C, when raised, is securely held in place by the arms D, having longitudinal slots in one end, as shown at *b*, to receive the pins *a*, upon which they hang or rest, and also beaks or jaws *c*. The pins *a* are placed beneath the main table or other like convenience and back from the edg eof the same. When, therefore, the auxiliary table is lowered by the side of the stand or table, the pins *a* will rest against what in that position will be the upper ends of the slots *b*. In elevating the auxiliary table it is raised in such a manner as to keep the pins *a* at the ends of the slots *b* until it reaches a horizontal position, or until the jaws *c* are on or above the level of the top of the stand. The auxiliary table and its supporting arms or brackets D are now slid bodily toward the stand (the slots *b* allowing this movement) until the jaws *c* catch over the edge of the stand, as shown in Fig. 2, at which time the pin *a* will have about arrived at the other end of the slots *b*. The auxiliary table is thus firmly clamped and held.

In order, however, to increase the security of the fastening, I form in the end of the slot in which the pins *a* rest when the table is raised depressions or recesses *d*, into which the pins *a* are forced by the action of the clamps or jaws, as indicated by the position of the brackets in Fig. 2, thus preventing the accidental sliding back or displacement of the table.

In order to allow this particular form of the auxiliary table to lie snugly against the legs or side and under the top of the main table without making the brackets of too great length, and in order to reach the elevated cloth-plate when that is desired, I make the auxiliary table of two parts, $c'$ and $c^3$, hinged together at $c^2$, as indicated in the drawings, the brackets being secured to the outer or lower section. By reason of this construction, while the auxiliary table is being raised or lowered, the leaf or section $c'$ can be swung so as to clear the edge of the stand, with which it would otherwise come in contact; and after the movement of the auxiliary table in either direction is completed it can then be brought back on the prolongation of the other section, or in the one case folded down to lie snugly against the side and below the top of the stand, as the case may be.

I do not confine myself to any particular plane, however, but vary the plane of the auxiliary table at will to suit differently-constructed machines and different operators. As, for instance, where it is desired to have the plane of the auxiliary table on or near the plane of the main table, I adopt the following plan, viz: The plate of the arm D, to which the table $c^3$ is attached, is depressed to the desired degree, and the edge of the auxiliary table $c^3$ is brought forward far enough to take the edge of the table A, as now in the illustration the beak *c* takes or rests on the same. Thus the same clamping effect is secured and the beak *c* of the bracket D may be omitted, its function being performed by the edge of the auxiliary table used without the extra leaf $c'$; or the auxiliary table and bracket D may be still further depressed, and the two edges of the tables, beaded and molded to fit, may be brought together so that both tables shall be in the same plane. The beaded and molded edges act in that case with the slot *b* and pin *a* to clamp and firmly hold the tables together, or permit them to part, as in the other cases; and, further, I contemplate the attachment and support, not only of what may be technically called a "table" in the manner indicated, but any other auxiliary attachment which it is desirable to connect with a sewing-machine stand, table, shelf, or other like convenience for additional supporting purposes, as, for instance, one or more rods, round or square, may be separately attached in like manner for the purpose of sustaining skirts and other voluminous kinds of work, and may be considered as so many sections of the table, as above described and illustrated.

In this, my invention, I do not consider the particular form of the bracket, hinge, or supporting-arm as of so much importance as the location of the plane of the immediate points of its attachment or suspension. I preferably use the form of bracket and clamp D, but a hinge of the nearly common form may be used and be so attached that the point of flexion shall be underneath and back from the edge of the table. The outer leaf of the hinge may be elongated to meet the necessities of the case, and engaged by snap or other catches when the auxiliary table is elevated for use. So other means of attachment have suggested themselves to me. Neither do I consider the location of the points of attachment or suspension in the said plane as essential. This may be varied. But what I do consider essential is the location of these points in a plane or planes within the perpendicular plane of the edge of the main table.

Therefore, what I claim, and desire to secure by Letters Patent, is—

The point or points of attachment and suspension of an auxiliary table or other support in a plane or planes within the perpendicular plane of the edge of the main table or other like convenience, for the purpose specified.

JAMES BLAKE.

Witnesses:
I. J. POST,
I. P. HAND.